(12) United States Patent
Morgan

(10) Patent No.: US 9,322,333 B2
(45) Date of Patent: Apr. 26, 2016

(54) SYSTEM AND METHOD FOR DETERMINING A COOLING FLOW PARAMETER DOWNSTREAM FROM A GAS TURBINE COMBUSTOR

(75) Inventor: Rex Allen Morgan, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 853 days.

(21) Appl. No.: 13/345,278

(22) Filed: Jan. 6, 2012

(65) Prior Publication Data

US 2013/0174564 A1 Jul. 11, 2013

(51) Int. Cl.
*F02C 7/18* (2006.01)
*F02C 9/18* (2006.01)
*F02C 9/16* (2006.01)

(52) U.S. Cl.
CPC ... *F02C 7/18* (2013.01); *F02C 9/16* (2013.01); *F05D 2270/3062* (2013.01); *F05D 2270/708* (2013.01)

(58) Field of Classification Search
CPC .............. F02C 7/18; F02C 6/08; F02C 9/18; F23R 3/06; F02D 41/1441; F23N 5/006; F23N 5/003
USPC ........ 60/262, 782, 785, 794–795, 39.23, 806, 60/39.85, 276, 39.281, 39.27, 39.3
See application file for complete search history.

(56) References Cited

U.S. PATENT DOCUMENTS

| | | | | |
|---|---|---|---|---|
| 5,533,329 | A * | 7/1996 | Ohyama et al. | 60/773 |
| 6,487,863 | B1 * | 12/2002 | Chen | F02C 6/08 60/39.12 |
| 6,715,916 | B2 * | 4/2004 | Tomlinson et al. | 374/144 |
| 7,742,904 | B2 | 6/2010 | Healy et al. | |
| 2004/0011050 | A1 * | 1/2004 | Inoue | 60/773 |
| 2004/0040366 | A1 * | 3/2004 | Matsubara et al. | 73/1.06 |
| 2005/0066664 | A1 * | 3/2005 | Shibata et al. | 60/775 |
| 2009/0044534 | A1 * | 2/2009 | Carapellucci et al. | 60/645 |
| 2009/0056342 | A1 * | 3/2009 | Kirzhner | 60/772 |
| 2009/0241506 | A1 * | 10/2009 | Nilsson | 60/39.24 |
| 2011/0037276 | A1 * | 2/2011 | Hoffmann et al. | 290/40 |
| 2011/0173953 | A1 * | 7/2011 | Neels et al. | 60/274 |
| 2012/0096835 | A1 * | 4/2012 | Gates et al. | 60/274 |
| 2015/0059355 | A1 * | 3/2015 | Feigl | F02C 7/18 60/782 |

* cited by examiner

*Primary Examiner* — William H Rodriguez
*Assistant Examiner* — Thomas Burke
(74) *Attorney, Agent, or Firm* — Dority & Manning, PA

(57) ABSTRACT

A method for determining a cooling flow parameter of a cooling medium supplied through a gas turbine is disclosed. The method may generally include receiving a signal associated with a first value of a combustion product parameter at a location within a combustion zone of the gas turbine, receiving a signal associated with a second value of a combustion product parameter at a location downstream of the combustion zone, comparing the first and second values of the combustion product parameter and determining a cooling flow parameter of the cooling medium based on the comparison of the first and second values.

9 Claims, 3 Drawing Sheets

SYSTEM AND METHOD FOR DETERMINING A COOLING FLOW PARAMETER DOWNSTREAM FROM A GAS TURBINE COMBUSTOR

FIELD OF THE INVENTION

The present subject matter relates generally to a gas turbine, and more particularly to a system and method for determining cooling flow parameters of a cooling medium supplied through a gas turbine.

BACKGROUND OF THE INVENTION

Modern gas turbines generally operate at elevated temperatures for extended periods. These elevated temperatures may significantly limit the life of individual components within the gas turbine, thus potentially resulting in costly scheduled and unscheduled outages for the operators. Consequently, thermal and mechanical stresses within the gas turbine, specifically within a hot gas path region of the gas turbine, are critical considerations for gas turbine designers.

During gas turbine operation, a compressor provides a steady source of a compressed working fluid, such as air, that may be channeled to a combustor of the gas turbine, wherein the compressed working fluid may be utilized for cooling various mechanical components within the combustor. In addition, the compressed working fluid may be mixed with a fuel and the mixture ignited in the combustor, thus providing a hot gas that expands rapidly through the combustor and into a turbine section of the gas turbine. The hot gas flows across a series of stationary vanes and rotating blades connected to a rotor shaft, wherein kinetic energy is transferred from the hot gas to one or more stages of the rotating blades, thus turning the rotor shaft and producing work. As a result, the turbine section is exposed to extreme operating temperatures. Existing methods for reducing the temperatures within the turbine section include flowing a cooling medium, such as a portion of the compressed working fluid, through multiple cooling passages located throughout the turbine section. In this manner, the cooling medium generally mixes with the hot gas as the mixture flows from the turbine section to an exhaust outlet of the gas turbine.

In current gas turbine designs, the flow rate of the cooling medium is generally an estimate based on design calculations and gas turbine models. During design validation testing, various gas turbine operating parameters such as pressures and temperatures are measured and compared to the design calculations and models. If the measurements fall within certain limits, the estimated flow rate of the cooling medium is assumed correct. However, it has been observed that the actual cooling medium flow rate of many gas turbines is much higher than assumed, thus resulting in diminished gas turbine efficiency.

Accordingly, a method and a system that determines parameters of a cooling medium, such as the actual flow rate of a cooling medium through the turbine section of a gas turbine, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for determining cooling flow parameters of a cooling medium supplied through a gas turbine. The method may generally include receiving a signal associated with a first value of a combustion product parameter at a location within a combustion zone of the gas turbine, receiving a signal associated with a second value of a combustion product parameter at a location downstream of the combustion zone, comparing the first and second values of the combustion product parameter and determining a cooling flow parameter of the cooling medium based on the comparison of the first and second values.

In a further aspect, the present subject matter discloses a system for determining cooling flow parameters of a cooling medium supplied through a gas turbine. The system may generally include a first sensor disposed at or adjacent to a combustion zone of the gas turbine, wherein the first sensor may be configured to detect a first value of a combustion product parameter of the gas turbine. The system may further include a second sensor disposed downstream of the combustion zone, wherein the second sensor may be configured to detect a second value of the combustion product parameter. The system may also include a controller communicatively coupled to the first and second sensors, wherein the controller may be configured to compare the first and second values of the combustion product parameter and determine a cooling flow parameter of the cooling medium supplied through the gas turbine based on the comparison of the first and second values.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
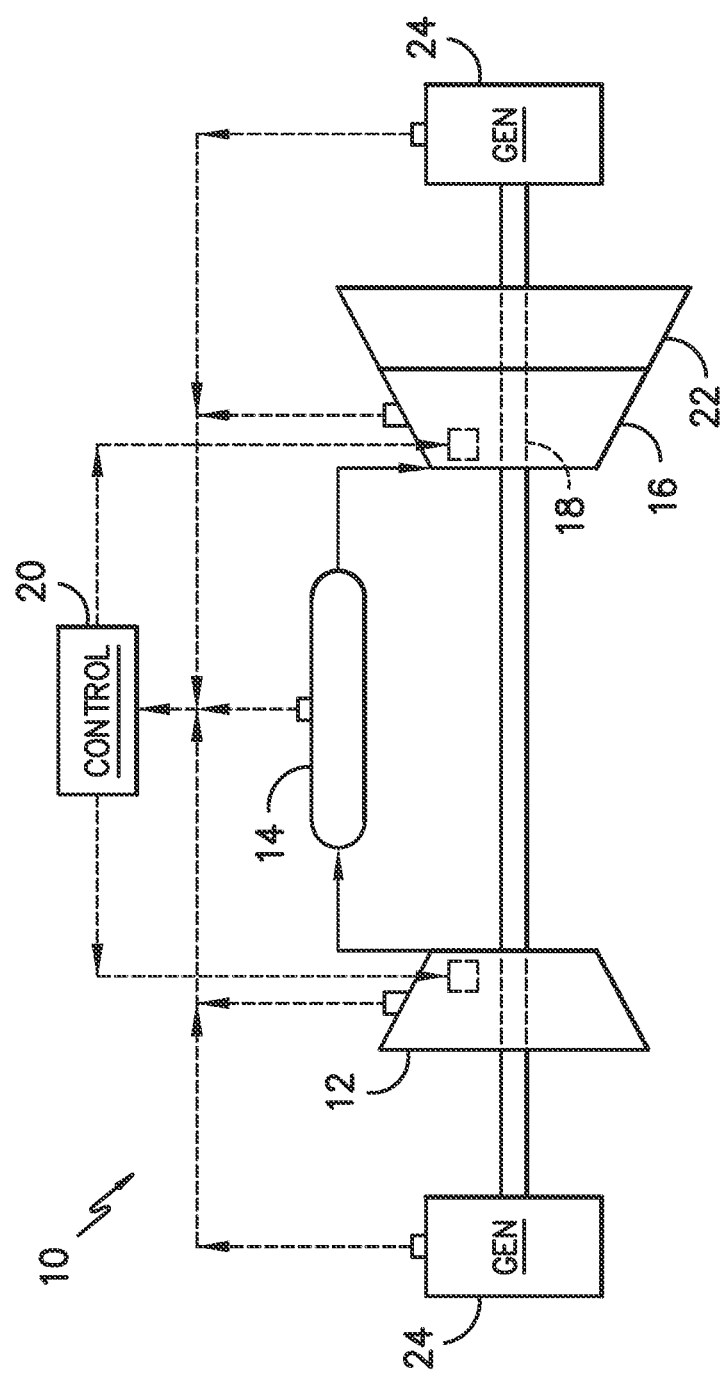
FIG. 1 illustrates a schematic depiction of a gas turbine according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Various embodiments of the present invention include a method for determining one or more cooling flow parameters of a cooling medium, such as a flow rate of a cooling medium supplied through a turbine section of a gas turbine. Generally, a fuel and air mixture is ignited in a combustion zone of a gas turbine combustor, thus producing a hot gas containing varying concentrations of oxygen, nitrogen, carbon monoxide, carbon dioxide, argon, sulfur dioxide and/or other byproducts of the combustion process. A gas turbine controller receives a first signal associated with a first value of a combustion product parameter, such as a concentration of oxygen, from a sensor disposed within a combustion zone of the combustor. The controller receives a second signal associated with a second value of the combustion product parameter from a second sensor disposed downstream from the combustion zone. The controller compares the first and second values of the combustor product parameters and determines a cooling flow parameter of the cooling medium, such as the cooling flow rate, based on variations in the first value of the combustion product parameter and the second value of the combustion product parameter.

Although exemplary embodiments of the present invention will be described generally in the context of an industrial gas turbine, for purposes of illustration, one of ordinary skill in the art will readily appreciate that embodiments of the present invention may be applied to any gas turbine and are not limited to industrial gas turbines unless specifically recited in the claims.

Figure 2:
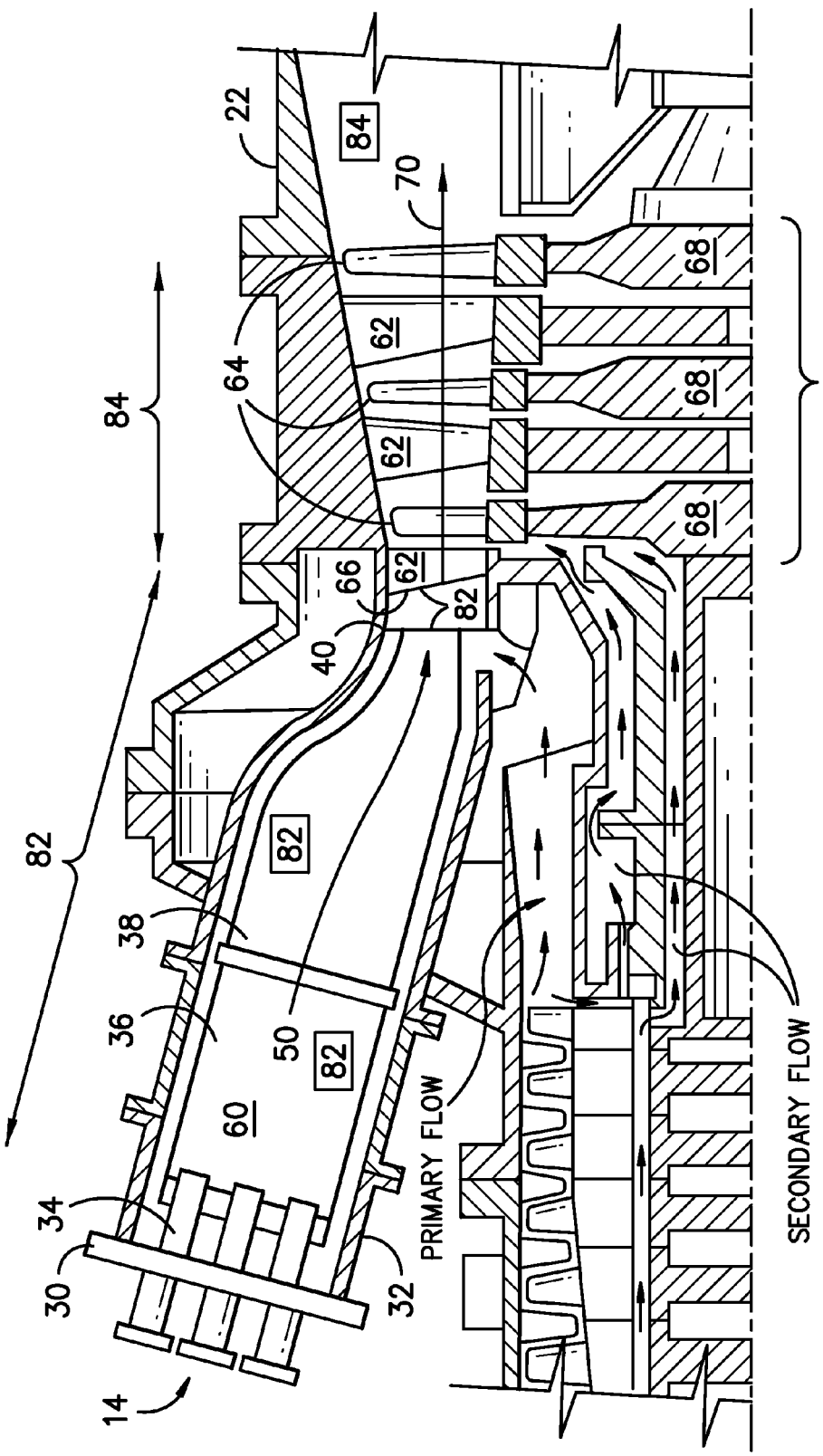
FIG. 2 is an enlarged cross section of a gas turbine according to at least one embodiment of the present subject matter.

FIG. 1 is a schematic view of a gas turbine 10, and FIG. 2 is an enlarged cross section of a gas turbine 10 according to one embodiment of the present invention. As shown in FIG. 1, the gas turbine 10 may include a compressor 12, a combustor 14 in fluid communication with the compressor 12, a turbine section 16 downstream and in fluid communication with the combustor 14 and/or the compressor 12, a turbine shaft 18 and a controller 20. The turbine section generally terminates at an exhaust duct 22. In addition, the gas turbine may include one or more generators 24 coupled to the turbine section 16 and/or the compressor 12. Although a single combustor 14 is shown, the gas turbine 10 may include a plurality of combustors 14 in fluid communication with the turbine section 16. For example, the gas turbine may include at least one combustor 14 positioned along the turbine section 16 as may be found in a reheat gas turbine. As shown in FIG. 2, each combustor(s) 14 may include an end cover 30, a combustor casing 32 and one or more fuel nozzles 34 extending downstream from the end cover 30. A combustion liner 36 may extend downstream from the end cover 30 and may connect to a generally annular transition piece 38 that extends downstream from the combustion liner 36. The combustion liner 36 may generally surround the one or more fuel nozzles 34. The transition piece 38 includes a downstream end 40 that generally terminates adjacent to an upstream end of the turbine section 16. The combustion liner 36 and the transition piece 38 generally provide a flow path 50 for hot gases to flow from the combustor(s) 14 to the turbine section 16.

A combustion zone 60 disposed within the combustion liner 36 and the transition piece 38 may generally extend from a point downstream of the one or more fuel nozzles 34, through the flow path 50 and terminate at the upstream end of the turbine section 16. The turbine section 16 generally includes alternating stages of stationary vanes 62 and rotating blades 64 generally concentric with the turbine shaft 18 and beginning with a first stage of the stationary vanes 62. Each stationary vane 62 of the alternating stationary vane stages may include a leading edge 66 disposed generally at an upstream point of the stationary vane 62. The rotating blades 64 may be coupled to one or more disks 68 and the disks 68 may be coupled to the turbine shaft 18 shown in FIG. 1. The turbine section 16 may include a plurality of passages providing fluid communication between the compressor and the turbine for providing a cooling flow to the turbine section 16. Generally, the alternating stages of the stationary vanes 62 and the rotating disks 68 define a hot gas path 70 through the turbine section for the hot gases flowing from the combustor(s) 14. As shown in FIG. 2, in particular embodiments, the upstream end of the turbine section 16 may be defined as a point downstream from the leading edge 66 of the one or more stationary vanes 62 of the first stage of stationary vanes 62. In alternate embodiments, the upstream end of the turbine section 16 may be defined as a point downstream from the downstream end of the transition piece 38.

The controller 20 may generally be any turbine control system known in the art that permits a gas turbine 10 to be controlled and/or operated as described herein. For example, the controller 20 may comprise a General Electric SPEEDTRONIC Gas Turbine Control System, such as is described in Rowen, W. I., "SPEEDTRONIC Mark V Gas Turbine Control System", GE-3658D, published by GE Industrial & Power Systems of Schenectady, N.Y. Generally, the controller 20 may comprise any computer system having a processor(s) that executes programs, such as computer readable instructions stored in the controller's memory, to control the operation of the gas turbine 10 using sensor inputs and instructions from human operators. The commands generated by the controller 20 may manipulate actuators and/or other mechanical or electromechanical devices coupled to the gas turbine and configured to regulate fluid flow through the gas turbine 10, so as to satisfy performance objectives while complying with operational boundaries of the gas turbine 10.

In operation, a working fluid, such as air, flows through the compressor 12 to provide a compressed working fluid to the combustor(s) 14. The greatest portion of the compressed working fluid, hereinafter referred to as the "primary flow", is directed to the combustor(s) 14 for cooling various components, such as the combustion liner 36 and the transition piece 38, and for mixing with a fuel to produce a combustible mixture. The remaining portion of the compressed working fluid, hereinafter referred to as the "secondary flow" may be channeled to various sections of the gas turbine 10. For example, the secondary flow may be extracted from the gas turbine 10 to support auxiliary processes and/or channeled to the turbine to provide a cooling flow. The combustible mixture is ignited within the combustion zone 60, thereby creating a rapidly expanding hot gas. The hot gas may generally include various concentrations of combustion products including but not limited to oxygen, carbon monoxide, carbon dioxide, nitrogen, water and/or argon. The hot gas flows through the combustion zone 60 along the flow path 50, exits the combustor at the downstream end 40 of the transition piece 38 and flows into the hot gas path 70. The portion of the secondary flow channeled to the turbine for cooling may enter the hot gas path 70 through the plurality of passages, mix with the hot gas flowing through the turbine section 16 and exit the turbine section 16 through the exhaust duct 22 disposed downstream from the turbine section 16. As the hot gas flows through the hot gas path 70, it imparts kinetic energy from the hot gas to the rotating blades 64, thus causing the turbine shaft 18 to rotate and produce mechanical work. The mechanical work produced may drive the compressor 12 or other external loads, such as the one or more generators 24, as shown in FIG. 1, to produce electricity.

In one or more embodiments, as shown in FIG. 2, the gas turbine 10 may include a system 80 for determining a cooling flow parameter of a cooling medium supplied through the gas turbine 10. It should be appreciated that, as used herein, the term "parameter" refers to an item(s) that may be used to define the operating conditions of the gas turbine 10, such as temperatures, pressures, fluid flow rate, gas concentrations, and/or water content. In particular, the cooling flow parameter may include but is not limited to secondary and/or cooling flow rate, gas concentration, temperature, pressure, water content and/or any other fluid parameter of the cooling flow. Some parameters may be measured using sensors and thus, may be directly known. Other parameters may be estimated using design calculations and/or a gas turbine 10 model. The measured and/or estimated parameters may generally be used to represent a given gas turbine 10 operating state.

As shown in FIG. 2, the system 80 may generally include at least a first sensor 82 and a second sensor 84 communicatively coupled to the controller 20 and configured for measuring a combustion product parameter of the gas turbine 10. Each sensor may be configured to transmit signals associated with the sensed combustion product parameter to the controller via the coupling. As used herein, the term "combustion product parameter" refers to one or more of the elements and/or compounds present within the combustor 14, the combustion zone 60, the hot gas path 70 and/or the exhaust duct 22 of the gas turbine 10 as a result of the combustion process. For example, in particular embodiments, "combustion product parameter" may correspond to the concentration of oxygen, carbon dioxide, argon, carbon monoxide, nitrogen, water and/or the like. As such, the first and second sensors 82 & 84 respectfully, may include but are not limited to at least one of an oxygen sensor, a carbon dioxide sensor, a carbon monoxide sensor, a nitrogen sensor, an argon sensor or a water sensor.

In various embodiments, the first sensor 82 may be disposed at or adjacent to the combustion zone 60 and configured to detect a first value of the combustion product parameter. As disclosed above, the combustion zone may generally extend from a point downstream of the one or more fuel nozzles 34, through the flow path 50 and terminate at the upstream end of the turbine section 16. In alternate embodiments, the combustion zone may extend to the leading edge 66 of the stationary vanes 62 of the first stage of stationary vanes 62. In particular embodiments, the first sensor 82 may be disposed at a point downstream from the one or more fuel nozzles 34 within the combustion liner 36, within the transition piece 38, at the downstream end 40 of the transition piece 38 and/or along the leading edge 66 of one or more of the stationary vanes 62 of the first stationary vane stage. In further embodiments, the first sensor 82 may extend generally radially inward from the combustion liner 36 and/or the transition piece 38 and into the combustion zone 60. In particular embodiments, the system 80 may further include a plurality of the first sensors 82 disposed at various locations throughout the combustion zone as described above.

The second sensor 84 may be disposed generally downstream of the combustion zone 60 and configured to detect a second value of the combustion product parameter provided by the first sensor 82. In particular embodiments, the second sensor 84 may be disposed within the exhaust duct 22, adjacent to the a last stage of the rotating blades 64, to a surface of one or more of the stationary vanes 62, adjacent to one or more of the stationary vanes 62 and/or at any point within the hot gas path 74 of the turbine section 16. In alternate embodiments, the system may further include a plurality of the second sensors 84 disposed downstream of the combustion zone 60 at one or more of the positions described above. For example, at least one of the plurality of second sensors 84 may be disposed adjacent to each rotating blade stage 64, at each stationary vane 62 stage and/or within the exhaust duct 22.

The controller 20 may be configured to compare the first and second values of the combustion product parameter provided by the first and second sensors, 82 and 84 respectfully, to determine one or more cooling flow parameters of the cooling medium supplied through the gas turbine 10. In certain embodiments, the one or more parameters of the cooling medium may include the flow rate of the cooling medium through the turbine section 16. In particular embodiments, the controller 20 may be configured to determine one or more of the cooling flow parameters of the cooling medium by calculating difference values between the first and second combustion product parameter values. In addition or in the alternative, the controller may be configured to generate an output signal for controlling the cooling flow parameter of the cooling medium, such as the flow rate of the cooling medium through the gas turbine 10.

Figure 3:
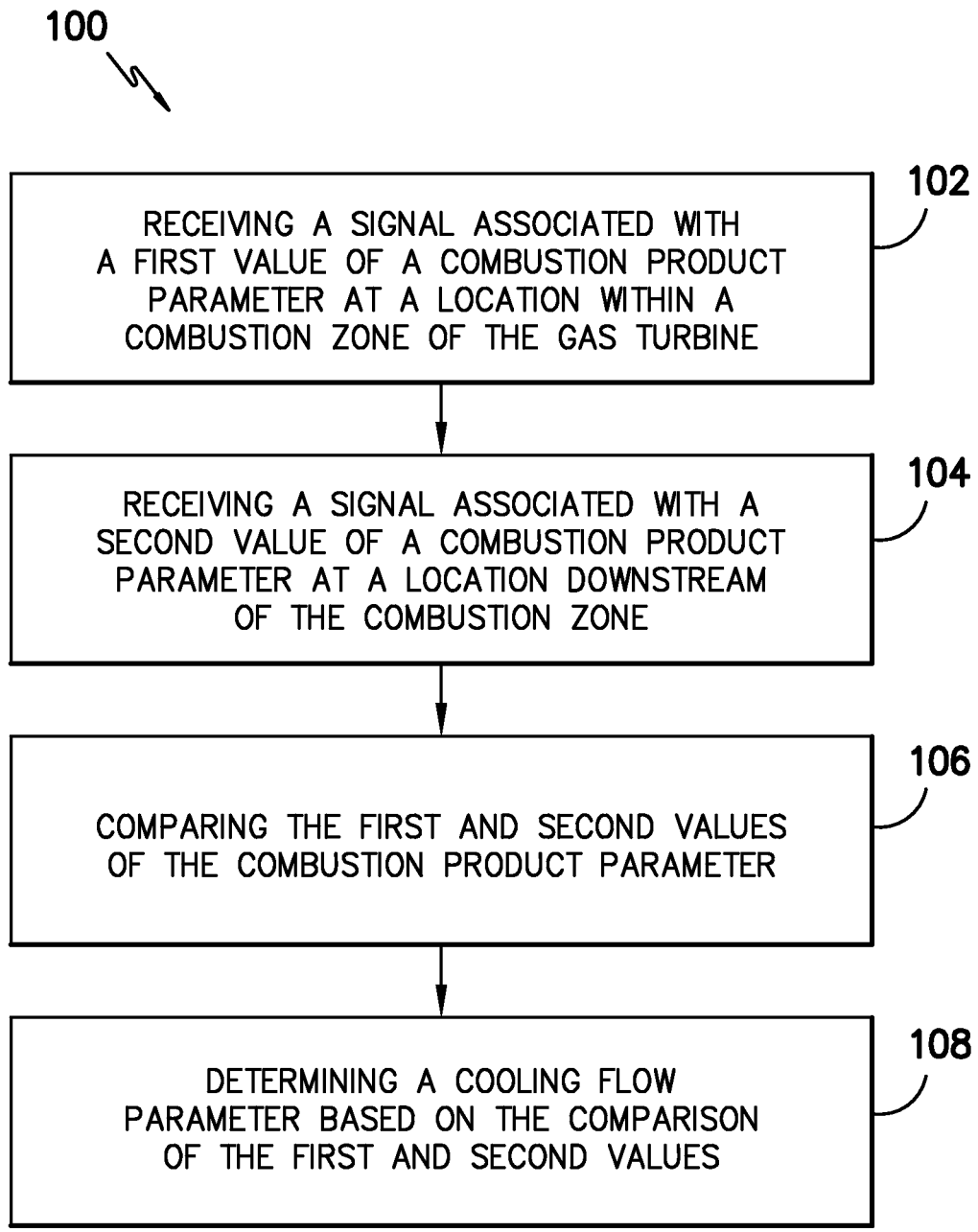
FIG. 3 is a block diagram of a method according to the present subject matter.

The various embodiments shown and described with respect to FIGS. 1 and 2 may also provide, as shown in FIG. 3, a method 100 for determining a cooling flow parameter of a cooling medium supplied through the gas turbine 10. As shown in FIG. 3, the method 100 may generally include receiving a signal associated with a first value of one or more of the combustion product parameters at a location within the combustion zone 102, receiving a signal associated with a second value of one or more of the combustion product parameters from a location downstream from the combustion zone 104, comparing the first and second values of the combustion product parameter 106 and determining a cooling flow parameter of the cooling medium based on the comparison of the first and second values 108. Thus, the disclosed method may allow various cooling flow parameters of the cooling medium, such as cooling medium flow rate, to be measured rather than estimated, thus allowing for validation of design assumptions and improved gas turbine efficiency.

As shown in FIG. 3, in 102, a signal is received that is associated with a first value of one or more of the combustion product parameters at a location within the combustion zone 60. For example, as disclosed above, one or more of the first sensors 82 may be disposed within the combustion zone 60 and configured to detect a first value of a combustion product parameter, such as oxygen concentration. The first sensor may then communicate the sensed first value to the controller for subsequent processing and/or analysis. In certain embodiments, the method may further include receiving a plurality of the signals associated with the first value of the combustion product parameter from a plurality of the first sensors 82 disposed within the combustion zone 60. Wherein the plurality of the signals is received by the controller 20, the controller 20 may generate an averaged first value, calculate a median/mean first value, and/or provide any statistical or analytical analysis based on the plurality of signals in order to generate the first value. In particular embodiments the combustion product parameter associated with the first value may include at least one of oxygen concentration, carbon dioxide concentration, nitrogen concentration or water concentration.

As shown in FIG. 3, in 104, a signal is received that is associated with a second value of the one or more combustion product parameters at a location downstream from the combustion zone 60. For example, as disclosed above, one or more of the second sensors 84 may be disposed within the exhaust duct 22, adjacent to the last stage of rotating blades 64, to a surface of one or more of the stationary vanes 62, adjacent to one or more of the stationary vanes 62 and/or at any point within the hot gas path 70 of the turbine section 16. The second sensor 84 may be configured to detect a second value of the combustion product parameter detected by the first sensor 82. The second sensor 84 may then communicate the sensed second value to the controller 20 for subsequent processing and/or analysis. In certain embodiments, the method may further include receiving a plurality of the signals associated with the second value of the combustion product parameter from a plurality of the second sensors 84 mounted downstream from the combustion zone 60. Wherein the plurality of signals is received by the controller 20, the controller 20 may generate an averaged second value, calculate a median/mean second value, and/or provide any statistical or analytical analysis based on the plurality of signals in order to generate the second value. In particular embodiments the combustion product parameter associated with the second value may include at least one of oxygen concentration, carbon dioxide concentration, nitrogen concentration or water concentration.

As shown in FIG. 3, in 106, the first and second combustion product parameter values from steps 102 and 104 may be compared by calculating difference values between the first and second values of the combustion product parameters. This step may also be carried out by the controller 20. For example, in particular embodiments, the controller 20 may receive the signals associated with the first value and the second value of a combustion product parameter, such as oxygen concentration, from the first and second sensors, 82 and 84 respectively. The controller 20 may then calculate the difference values, for example, by adding or subtracting a first value of X percent oxygen concentration to/from a second value of X+1 percent oxygen concentration, thus reflecting an increase in oxygen concentration of the hot gas as it passed through the turbine section 16. The controller 20 may then compare the calculated difference values to measured, predicted or known oxygen concentration levels of the cooling medium prior to mixing with the hot gas in the turbine section 16 in order to determine one or more of the cooling flow parameters, such as a measured flow rate of the cooling medium.

The method may further include modifying the cooling flow parameter based on the comparison of the first and second values of the combustion product parameters and/or comparing the measured flow rate to a design baseline cooling medium flow rate, calculating a flow rate parameter difference value and adjusting one or more gas turbine operating parameters accordingly. For example, the controller 20 may generate an output signal based on the comparison of the first and second values, the flow rate parameter difference values and/or the resulting value of the cooling flow parameter. In particular embodiments, the controller 20 may be communicatively coupled to one or more fluid flow control devices, such as an actuator and/or a flow regulator in fluid communication with the combustor 14, the turbine section 16 and/or with any part of the gas turbine which may affect the cooling flow parameter. In this manner, the one or more fluid control devices may receive the output signal from the controller 20, thereby activating and/or manipulating the fluid control device(s) to modify the cooling flow parameter.

The technical effect of the present matter is improved performance and/or operation of a gas turbine. In particular, by determining a parameter of the cooling medium, such as flow rate, based on comparisons of measured combustion product parameters, gas turbine designs may be validated and the performance and/or operation of a gas turbine may be enhanced. For example, when the cooling medium flow rate exceeds or falls short of design estimates, the gas turbine may be manipulated to regulate the cooling medium flow rate, thus reducing the risk of overheating various components within the gas turbine typically exposed to extreme thermal stress. In addition, validation of the cooling medium flow rate on operational gas turbines may allow engineers and/or designers to anticipate potential issues with hardware life due to thermal stresses within the gas turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A method for determining cooling flow rate of a cooling medium within a turbine section of a gas turbine, the method comprising:
measuring a first oxygen concentration of combustion gases flowing through a combustor of the gas turbine downstream from a combustion zone defined within the combustor and upstream from an inlet of a turbine section of the gas turbine;
routing the combustion gases through a hot gas path of the turbine section;
introducing a cooling medium into the hot gas path within the turbine section downstream from the combustor such that the cooling medium mixes with the combustion gases therein;
measuring a second oxygen concentration of the combustion gases at one or more locations along the hot gas path of the turbine section downstream from the introduction of the cooling medium and upstream from a last stage of rotating blades of the turbine section; and
determining a cooling flow rate of the cooling medium within the turbine section based on a comparison of the first measured oxygen concentration and the second measured oxygen concentration.
2. The method of claim 1, further comprising modifying the cooling flow rate based on the comparison of the first measured oxygen concentration and the second measured oxygen concentration.
3. The method of claim 1, further comprising comparing the cooling flow rate to a design baseline cooling flow rate, calculating a cooling flow rate difference value and adjusting the cooling flow rate of the cooling medium into the turbine section.
4. The method of claim 1, wherein introducing a cooling medium comprises introducing compressed air from secondary flow of compressed air from a compressor disposed upstream from the turbine section.
5. The method of claim 1, wherein introducing a cooling medium comprises introducing steam into the hot gas path.
6. The method of claim 1, wherein measuring the first oxygen concentration includes receiving at least one signal at a controller from at least one sensor disposed within the combustor and in contact with the combustion gases upstream from the turbine section, wherein the sensor is an oxygen sensor.

7. The method of claim 6, wherein receiving at least one signal at a controller from at least one sensor disposed within the combustor and in contact with the combustion gases upstream from the turbine section includes receiving a plurality of signals from a plurality of sensors and generating an averaged first measured oxygen concentration from the plurality of signals.

8. The method of claim 1, wherein measuring the second oxygen concentration includes receiving at least one signal at a controller from at least one sensor disposed downstream from the introduction of the cooling medium and upstream from the last stage of rotating blades of the turbine section, wherein the sensor is an oxygen sensor.

9. The method of claim 8, wherein receiving at least one signal at a controller from at least one sensor disposed downstream from the introduction of the cooling medium and upstream from the last stage of rotating blades of the turbine section includes receiving a plurality of signals from a plurality of sensors disposed downstream from the introduction of the cooling medium and upstream from the last stage of rotating blades of the turbine section, and generating an averaged second measured oxygen concentration from the plurality of signals.

* * * * *